United States Patent [19]
Salomon

[11] Patent Number: 5,170,694
[45] Date of Patent: Dec. 15, 1992

[54] CARAFE WITH RELEASE MEMBER FOR AN OUTLET LOCK OF A COFFEE OR TEA MAKER

[75] Inventor: Thomas Salomon, Schloss Holte, Fed. Rep. of Germany

[73] Assignee: Melitta Haushaltsprodukte GmbH & Co. Kommanditgesellschaft, Minden, Fed. Rep. of Germany

[21] Appl. No.: 519,214

[22] Filed: May 7, 1990

[30] Foreign Application Priority Data

May 5, 1989 [DE] Fed. Rep. of Germany ....... 3914852

[51] Int. Cl.⁵ .................. A47J 31/00; A47J 31/46; A47J 31/50
[52] U.S. Cl. ............................ 99/299; 99/306
[58] Field of Search ............... 99/279, 299, 300, 304, 99/305, 306, 307, 295; 220/206, 367, 368, 377.1; 141/346, 348, 360, 349

[56] References Cited

U.S. PATENT DOCUMENTS

| | | | |
|---|---|---|---|
| 4,026,336 | 5/1977 | Spies | 141/348 |
| 4,146,069 | 3/1979 | Angorola | 141/349 |
| 4,356,848 | 11/1982 | Spies | 141/349 |
| 4,630,532 | 12/1986 | Sonnentag | 99/306 |
| 4,744,291 | 5/1988 | Wallin | 99/300 |
| 4,888,466 | 12/1989 | Hoffman | 99/307 |
| 4,924,922 | 5/1990 | Johnson | 99/295 |
| 4,991,635 | 2/1991 | Ulm | 141/352 |

FOREIGN PATENT DOCUMENTS

| | | | |
|---|---|---|---|
| 1079436 | 4/1960 | Fed. Rep. of Germany | 220/367 |
| 2658295 | 12/1976 | Fed. Rep. of Germany | 99/279 |
| 8810770 | 11/1988 | Fed. Rep. of Germany | |

*Primary Examiner*—Harvey C. Hornsby
*Assistant Examiner*—Tony G. Soohoo
*Attorney, Agent, or Firm*—Spencer, Frank & Schneider

[57] ABSTRACT

A carafe for a coffee or tea maker of the type having a mechanical outlet lock actuatable by a release member on a carafe. The carafe includes a glass container having an upper open end and a substantially flat bottom surface, which bottom surface defines a placement plane for supporting the carafe in the coffee or tea maker. There is a plastic lid attached to the upper open end of the glass container, along with a release member for actuating the mechanical outlet lock on the coffee or tea maker when the carafe is placed in the coffee or tea maker. The release member is accurately attached to the lid by an attachment between the lid and the release member at a predetermined distance from the bottom placement plane of the carafe.

4 Claims, 3 Drawing Sheets

CARAFE WITH RELEASE MEMBER FOR AN OUTLET LOCK OF A COFFEE OR TEA MAKER

CROSS REFERENCE TO RELATED APPLICATION

This application claims the priority of Federal Republic of Germany Application No. P 39 14 852.1 filed May 5, 1989, which is incorporated herein by reference.

BACKGROUND OF THE INVENTION

The present invention relates to a glass carafe or pitcher with a plastic lid for a coffee or tea maker whose filter vessel has a mechanical outlet lock which is actuated by a release member on the plastic lid of the carafe.

Coffee or tea makers frequently have a filter vessel which has a mechanically actuatable outlet lock, which is generally also called a drip lock. A release member or release mushroom attached to the plastic lid of the glass pitcher or carafe acts as the control member for actuating the outlet lock. The release member moves the outlet lock into its open position by pressing against it. Thus, as long as the glass carafe is disposed at a certain location below the filter vessel, the release mushroom keeps the outlet lock open and coffee or tea flows therethrough into the glass pitcher. As soon as the carafe and the plastic lid are removed from their normal position in the coffee or tea maker the outlet lock moves into its closed position, because the release mushroom is no longer keeping the outlet lock open.

In this way when the carafe is taken out from underneath the not yet completely empty filter vessel, the beverage is prevented from flowing out in an uncontrolled manner. Thus, coffee or tea cannot drip onto the warming tray usually disposed below the filter vessel and serving as a depository for the glass pitcher.

A prerequisite for the effective interaction of the outlet lock and the release mushroom is that the release mushroom have an accurately defined height position with respect to the placement plane of the glass carafe. In other words, given that the filter vessel and locking member are at a fixed distance from the warming tray, any glass carafe with a release mushroom must be accurately manufactured so that the release member is accurately positioned for precisely actuating the locking member when the glass carafe is put on the warming tray.

However, prior art glass pitchers having plastic lids are unsatisfactory because the plastic lid and its release mushroom are made as one piece. Although the plastic lid can be manufactured to close tolerances, the glass carafe cannot be made to close tolerances, whereby considerable deviations in the position of the release mushroom with respect to the placement plane of the carafe result.

SUMMARY OF THE INVENTION

It is an object of the present invention to provide a glass carafe or pitcher with a plastic lid for the stated purpose in which the setting of a predetermined distance for the release mushroom relative to the placement plane of the glass pitcher is possible by simple and economical means.

This and other objects are accomplished by the present invention in that the release mushroom is made as a separate component and is connected with the plastic lid at an accurately predetermined height position relative to the placement plane of the glass pitcher.

This mode of construction makes it possible to ensure, even given wide tolerances in glass container manufacture, that the release mushroom can compensate for variations in the height of carafes and an accurate height position relative to the placement plane of the carafe. After the predetermined height position has been set, the separately manufactured release mushroom can be connected with the plastic lid in a force or form locking manner or by an adhesion effect. For example, the release mushroom may be welded or glued to the plastic lid. Also, the release mushroom can be threaded onto the plastic lid.

When the release mushroom is screwed onto the lid, under certain circumstances, it would even be possible for the user of a coffee or tea maker to make fine adjustments if it is found that surprisingly wide tolerances exist in the region of the filter vessel and its outlet lock.

DETAILED DESCRIPTION OF THE PREFERRED EMBODIMENTS

Figure 1:
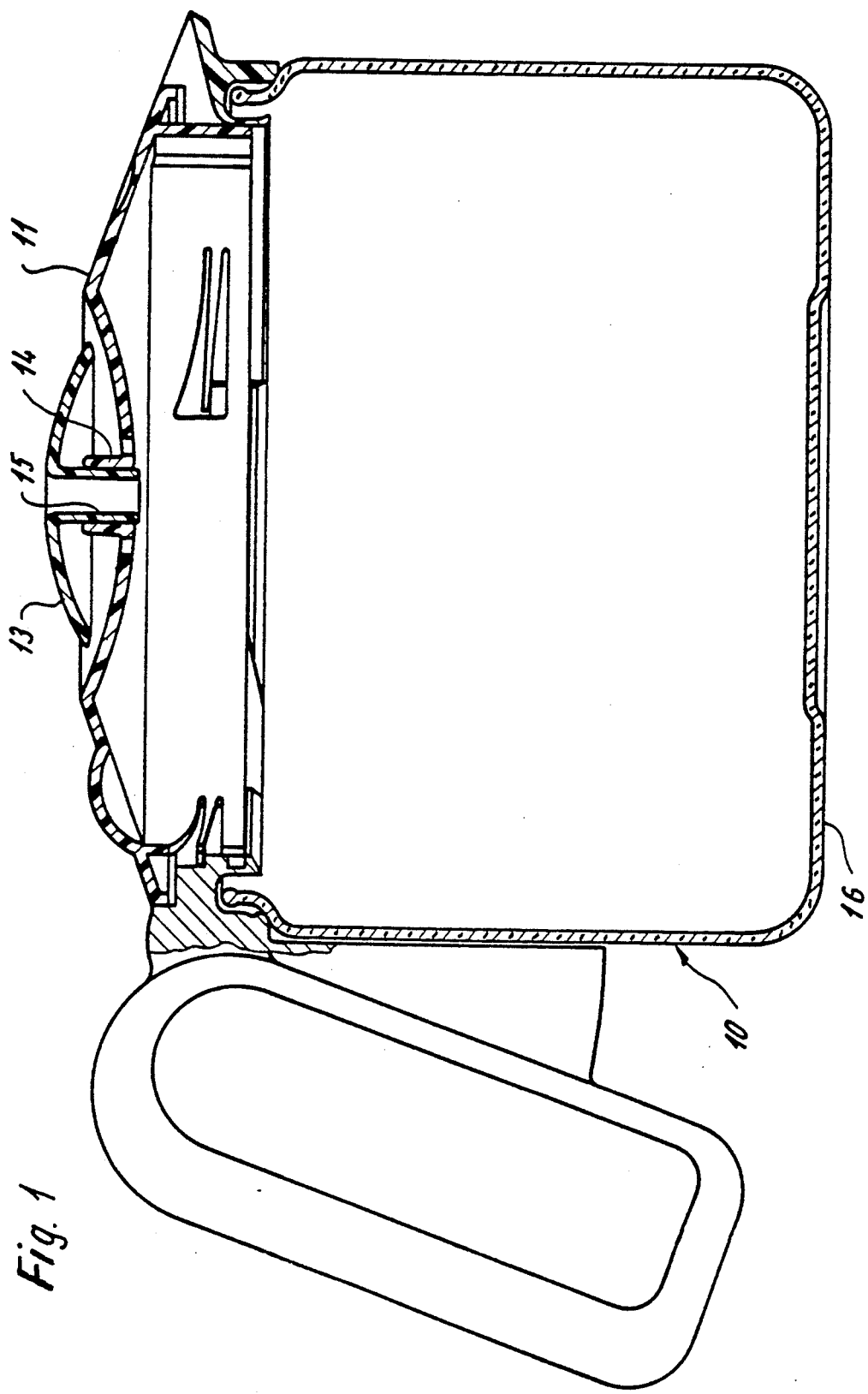
FIG. 1 is a sectional elevational view of a glass carafe equipped with a plastic lid according to a preferred embodiment of the invention.
Figure 3:
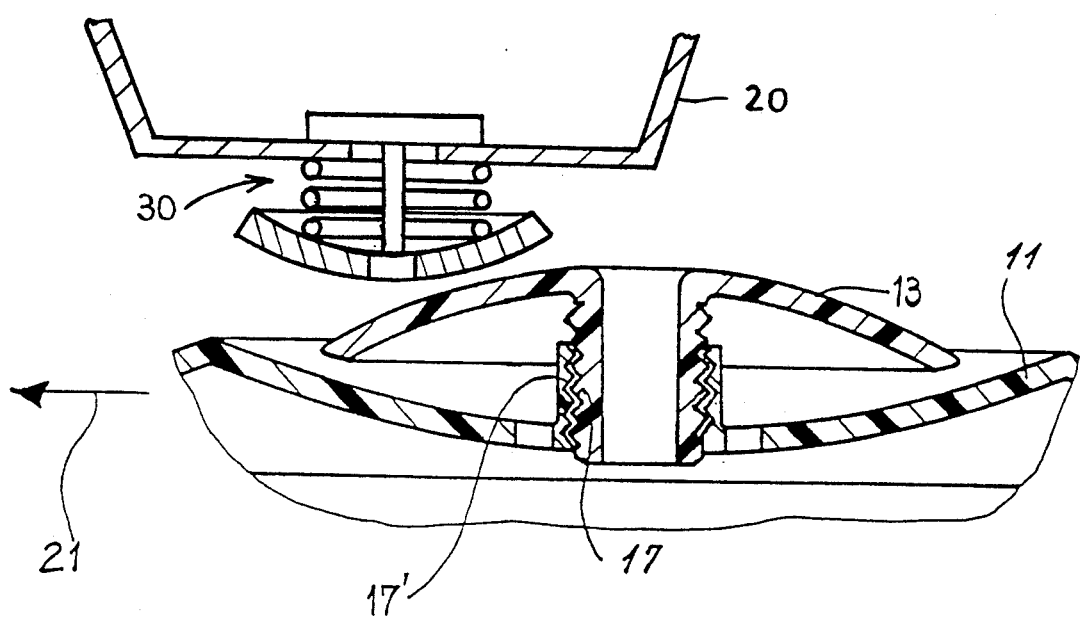
FIG. 3 is a view similar to FIG. 2 showing the further preferred embodiment of the invention in use.

As shown in FIGS. 1 and 3, the glass carafe or pitcher 10 of the present invention has a plastic lid 11, which has a release member or mushroom 13 for the actuation of a mechanical outlet lock 30 of the filter vessel 20 of a coffee or tea maker (shown in FIG. 3). The release mushroom 13 which, according to the invention, is made as a separate component, has a stem 15 which is inserted into a cylindrical collar 14 of the plastic lid 11. A fixed connection between release mushroom 13 and plastic lid 11 is established by welding or gluing after release mushroom 13 has been brought into an exactly predetermined height position relative to the placement plane 16 of glass pitcher 10.

Figure 2:
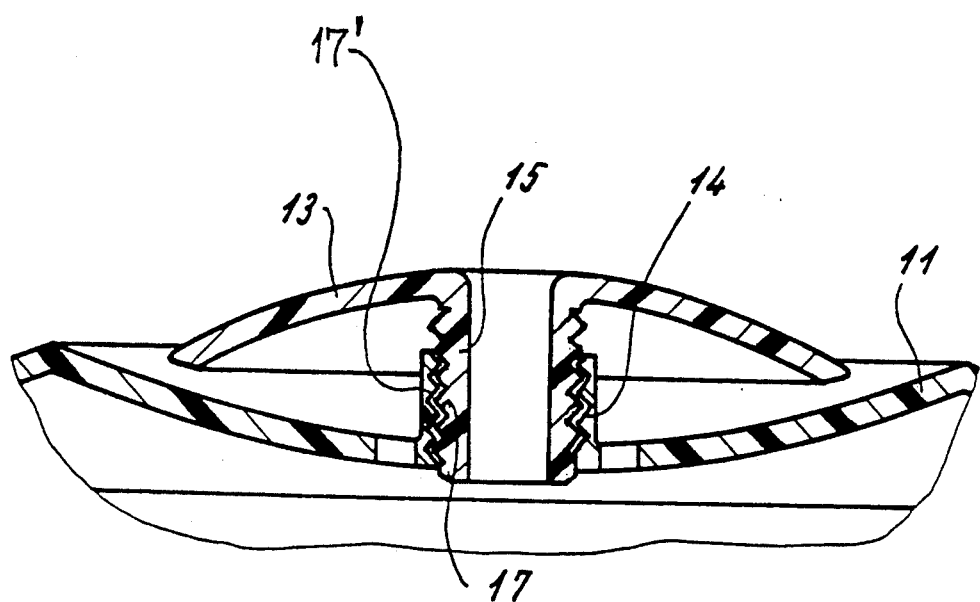
FIG. 2 is a sectional elevational view of a further preferred embodiment of the invention.

According to the embodiment of FIG. 2, a firm connection between the release mushroom 13 and the lid 11 is effected by a screw thread coupling. For this purpose, stem 15 as well as cylindrical collar 14 are provided with respective threads 17, 17', so that release mushroom 13 can be screwed into cylindrical collar 14 to a greater or lesser degree. This also enables a precisely predetermined height position to be set for release mushroom 13 relative to the placement plane 16 of the glass pitcher 10. Accordingly, in use, release member 13 can be threadably rotated relative to collar 14 for adjusting the relative distance between release member 13 and bottom (placement plane) 16 of carafe 10. Thus, the user can compensate for variations in the height of the glass container part of carafe 10 or variations in the location of the mechanical outlet lock of the individual coffee or tea maker relative to its warming tray by screwing release member 13 in or out relative to collar 14.

Turning to FIG. 3, the embodiment of FIG. 2 is shown in use. When the glass pitcher is placed under filter vessel 20 in a conventional manner, release member 13 is moved in the direction of arrow 21. As the pitcher approaches the conventional position for receiving brewed coffee from filter vessel 20, release member 13 engages the mechanical outlet lock 30, which is a known element for releasing brewed coffee from filter vessel 20 when actuated.

It will be understood that the above description of the present invention is susceptible to various modifications, changes and adaptations, and the same are intended to be comprehended within the meaning and range of equivalents of the appended claims.

I claim:

1. A carafe for a coffee or tea maker of the type having a mechanical outlet lock actuatable by a release member on a carafe, comprising:
   a glass container having an upper open end and a substantially flat bottom surface, said bottom surface defining a placement plane for supporting said carafe in a coffee or tea maker;
   a plastic lid attached to said upper open end of said glass container;
   a release member for actuating the mechanical outlet lock on a coffee or tea maker as said carafe is placed in the coffee or tea maker whereby said release member exerts an opening force on the mechanical outlet lock for effecting an opening motion of the mechanical outlet lock; said release member being a component separate from said plastic lid; and
   vertically adjustable attaching means disposed between said plastic lid and said release member to permit varying the height of said release member to said plastic lid at a desired accurate predetermined distance from said placement plane of said glass container and for holding said release member in the adjusted position immovably relative to said plastic lid during the opening motion of the mechanical outlet lock.

2. A carafe as defined in claim 1, wherein said attaching means comprises screw threads.

3. A carafe as defined in claim 1, further comprising a substantially cylindrical collar defining part of said plastic lid, and a stem defining part of said release member and projecting into said cylindrical collar.

4. A carafe as defined in claim 3, wherein said attaching means comprises interengaging screw threads provided on said collar and said stem.

* * * * *